(12) United States Patent
Holenstein et al.

(10) Patent No.: US 7,523,110 B2
(45) Date of Patent: Apr. 21, 2009

(54) HIGH AVAILABILITY DESIGNATED WINNER DATA REPLICATION

(75) Inventors: Bruce D. Holenstein, Media, PA (US); Gary E. Strickler, Pottstown, PA (US); Eugene P. Jarema, Downington, PA (US); Paul J. Holenstein, Downingtown, PA (US)

(73) Assignee: Gravic, Inc., Malvern, PA (US)

( * ) Notice: Subject to any disclaimer, the term of this patent is extended or adjusted under 35 U.S.C. 154(b) by 221 days.

(21) Appl. No.: 11/367,757

(22) Filed: Mar. 3, 2006

(65) Prior Publication Data

US 2006/0200533 A1 Sep. 7, 2006

Related U.S. Application Data

(60) Provisional application No. 60/658,103, filed on Mar. 3, 2005.

(51) Int. Cl.
| | |
|---|---|
| H04L 12/28 | (2006.01) |
| H04L 12/56 | (2006.01) |
| G06F 7/00 | (2006.01) |
| G06F 11/00 | (2006.01) |
| G06F 12/00 | (2006.01) |
| G06F 13/14 | (2006.01) |
| G06F 13/38 | (2006.01) |
| G06F 15/16 | (2006.01) |
| G06F 17/30 | (2006.01) |

(52) U.S. Cl. .............................. 707/8; 370/40; 707/201; 707/204; 709/205; 710/241; 710/242; 710/243; 710/244; 714/7

(58) Field of Classification Search ..................... 707/8, 707/201, 204; 370/400; 709/205; 710/243; 714/7
See application file for complete search history.

(56) References Cited

U.S. PATENT DOCUMENTS

| | | | | |
|---|---|---|---|---|
| 5,687,363 | A | * 11/1997 | Oulid-Aissa et al. | ............ 707/4 |
| 5,764,977 | A | * 6/1998 | Oulid-Aissa et al. | .......... 707/10 |
| 5,937,414 | A | 8/1999 | Souder et al. | |

(Continued)

OTHER PUBLICATIONS

W.H. Highleyman et al. "Breaking the Availability Barrier; Survivable Systems for Enterprise Computing," AuthorHouse; Dec. 2003, 393 pages.

*Primary Examiner*—James Trujillo
*Assistant Examiner*—Jorge A Casanova
(74) *Attorney, Agent, or Firm*—Panitch Schwarze Belisario & Nadel LLP

(57) ABSTRACT

Collisions are resolved in a database replication system. The system includes a plurality of nodes arranged in either a master-slave or network configuration. Each node includes a database, wherein changes made at the databases of each node are replicated to the databases at one or more of the other nodes. When a collision is detected during data replication between multiple nodes, the collision is resolved by a rule that gives precedence to certain nodes over other nodes.

26 Claims, 9 Drawing Sheets

MASTER/SLAVE, COLLISION

U.S. PATENT DOCUMENTS

| | | |
|---|---|---|
| 6,122,630 A | 9/2000 | Strickler et al. |
| 6,216,135 B1 * | 4/2001 | Brodersen et al. ........... 707/201 |
| 6,226,652 B1 * | 5/2001 | Percival et al. .............. 707/203 |
| 6,240,413 B1 * | 5/2001 | Learmont ...................... 707/8 |
| 6,269,428 B1 * | 7/2001 | Carpenter et al. ........... 711/150 |
| 6,523,076 B1 * | 2/2003 | Kruse ......................... 710/119 |
| 6,662,196 B2 | 12/2003 | Holenstein et al. |
| 6,745,209 B2 | 6/2004 | Holenstein et al. |
| 7,149,759 B2 * | 12/2006 | Morrison ................... 707/201 |
| 7,174,403 B2 * | 2/2007 | Ganasan ..................... 710/113 |
| 7,177,866 B2 * | 2/2007 | Holenstein et al. ............. 707/8 |
| 2003/0067941 A1 * | 4/2003 | Fall ............................ 370/468 |
| 2003/0120822 A1 * | 6/2003 | Langrind et al. ............. 709/251 |
| 2004/0003349 A1 * | 1/2004 | Ostertag et al. ............. 715/514 |
| 2004/0044702 A1 * | 3/2004 | Ferreira Alves et al. ..... 707/203 |
| 2004/0117667 A1 * | 6/2004 | Lavender et al. ............ 713/202 |
| 2004/0246902 A1 * | 12/2004 | Weinstein et al. ........... 370/238 |
| 2006/0047713 A1 * | 3/2006 | Gornshtein et al. ......... 707/202 |
| 2006/0117212 A1 * | 6/2006 | Meyer et al. .................... 714/4 |
| 2006/0173850 A1 * | 8/2006 | Auer et al. ..................... 707/10 |
| 2006/0190503 A1 * | 8/2006 | Naicken et al. ............. 707/204 |
| 2007/0143365 A1 * | 6/2007 | D'Souza et al. ............. 707/203 |
| 2007/0208694 A1 * | 9/2007 | Bayliss et al. .................. 707/2 |

* cited by examiner

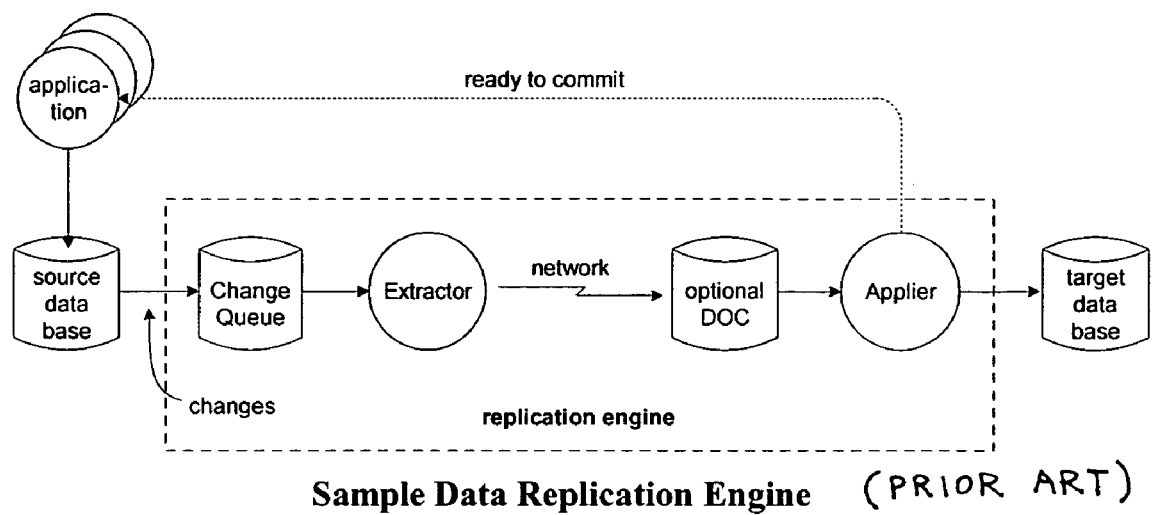
Sample Data Replication Engine (PRIOR ART)
FIGURE 1
$A \leftrightarrow B$
Two Node Cluster
FIGURE 2
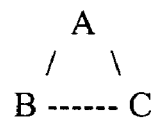
Three Node Cluster, All Nodes Connected to Each Other
FIGURE 3
$A \leftrightarrow B \leftrightarrow C$
3-node Route-Thru Architecture
FIGURE 4

A↔B↔C↔D↔E↔F↔G↔H
8-node Route-Thru Architecture
FIGURE 5
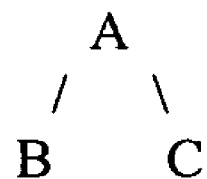
1 Master, 2 Slaves Example
FIGURE 6
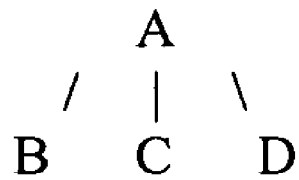
1 Master, 3 Slaves Example
FIGURE 7

```
AutoLoader Process Startup (ACF I/O is done against the source
side ACF file).

Tx₁ = BEGINTRANSACTION() - initiate tx #1
Tx₂ = BEGINTRANSACTION() - initiate tx #2 and do the following
work under tx #2:
INSERT (or UPDATE if it already exists) Tx₁ identification
information (such as the tx id) into the AutoLoad Control File
(ACF) record for this process
Commit Tx₂ - end tx #2

Note - ending a tx generally flushes its data into the database
change queue that replication uses to collect the database
changes to be replicated.

Loop:
Resume Tx₁ - do the following work under tx #1
Read all source records to be autoloaded (one approach is to
UPDATE each of these source records using a no-operation UPDATE
inside the normal AutoLoad cycle (e.g., 100 I/O's) - this adds
the record events to be autoloaded to the database change queue
that the replication engine uses for forwarding database change
events to the target).
Tx₃ = BEGINTRANSACTION() - initiate tx #3
Resume Tx₁ - do the following work under tx #1
Save the Tx₃ transaction identification information (such as the
transaction id) into the AutoLoad Control File (ACF)
Commit Tx₁ - end tx #1
Tx₁ = Tx₃ - assign tx #1 to be tx #3 (i.e., make tx #1 take on tx
#3's properties, such as transaction id, etc).
GOTO Loop: - jump to the LOOP if not done yet (e.g., there are
more records to AutoLoad)...
```
AutoLoader Transaction Management

FIGURE 8

```
ActiveTx = BeginTx() - start a transaction

LOOP:
NextTx = BeginTx() - start a new transaction
Resume(ActiveTx) - resume previous transaction
WriteCmdRecord(NextTx); - same transaction info
EndTx(ActiveTx) - commit the ActiveTx
ActiveTx = NextTx
Resume(ActiveTx) - resume the new transaction Do n file I/O's (n is configurable, say 100) under ActiveTX
If not EOF goto LOOP - if not end-of-file (or done processing),
jump to the LOOP location EndTx(ActiveTx) - end the current transaction BeginTx()
UpdateCmdRecord(with final load count)
EndTx()

BeginTx()
DeleteCmdRecord() - this is done to keep the command file small
with only 1 record per loading sequence
EndTx()

In this algorithm, ActiveTx and NextTx hold transaction
identifier context.

BeginTx() suspends the current transaction, and starts a
transaction and activates that transaction's context for the
process for subsequent processing (i.e., all subsequent I/O's
are done under that transaction id). Resume() resumes a
previously suspended transaction. EndTx() commits a transaction
and removes the current transaction context (i.e., Resume(Nil)).

WriteCmdRecord(),UpdateCmdRecord(),DeleteCmdRecord() insert,
update, and delete a command record in the command file (this
record holds the transaction id and other control/context
information to be used for the next batch of I/O's; it arrives
in audit (the change queue) before the I/O's that use that
transaction id.
```

Alternative Event/Transaction Identification Method

FIGURE 9

1. Initially, the ACF file is empty.
2. Before $Tx_1$ is AutoLoaded (by the Shadowbase AutoLoader), $Tx_1$ is inserted into ACF file (by the sequence described in section 3.2 – The Design of section 3 – Event or Transaction Identification Algorithms).
3. $Tx_1$: $1^{st}$ block of data is AutoLoaded, $Tx_2$ id is written to ACF.
4. $Tx_2$: $2^{nd}$ block of data is AutoLoaded, $Tx_3$ id is written to ACF.
5. $Tx_3$: $3^{rd}$ block of data is AutoLoaded, $Tx_4$ id is written to ACF.

...this cycle continues until done (all data to be loaded has been loaded)...

a) Failure before or after step 1 – Restarted data will precede use of $Tx_1$, all AutoLoader Tx's arrive in the replication engine via the ACF prior to their use as an AutoLoader Tx.
   b) Failure after step 2 – ACF holds $Tx_1$, which will be loaded at restart of consumer; since $Tx_1$ not used yet to load data, no issue.
   c) Failure after step 3 – if restart point is prior to step 3, no issue. If restart point is after step 3, no issue ($Tx_2$ is in ACF and $Tx_2$ will be replayed after restart).
   d) Failure after step 4 – assume restart is way back after step 2. At this point, the ACF holds $Tx_3$, but the first Tx the consumer sees is $Tx_1$. The replication engine will not know this was an AutoLoaded Tx, but that is OK – this Tx was already replayed previously as an AutoLoaded Tx. This time, it will just be replayed as a slave->master Tx. During replay, $Tx_2$ will be inserted into the ACF, and all subsequent AutoLoader Tx's are properly identified.

AutoLoader/Consumer Restart Logic

FIGURE 10

MASTER/SLAVE₁ COLLISION

SLAVE₁ / SLAVE₂ COLLISION

SYNC/ASYNC REPLICATION LINKS

RESOLVING COLLISIONS VIA RELAXING CONSTRAINTS

HIGH AVAILABILITY DESIGNATED WINNER DATA REPLICATION

CROSS-REFERENCE TO RELATED APPLICATION

This application claims the benefit of U.S. Provisional Patent Application No. 60/658,103 filed Mar. 3, 2005.

BACKGROUND OF THE INVENTION

Database replication is the process of creating and managing duplicate versions (replicas) of a database. The replicas are synchronized with each other so that changes made to one replica are reflected in all of the others. Replication allows many users to work with their own local copy of a database while allowing each local copy of the database to be updated as if it were working on a single centralized database. A "collision" occurs when a change is made simultaneously to two replicated versions of the same record (e.g., row) in different databases. Many schemes exist for detecting and resolving collisions. However, there is still a need for improved schemes that detect and resolve collisions. The present invention fulfills such a need.

BRIEF SUMMARY OF THE INVENTION

In one preferred embodiment of the present invention, collisions are resolved in an active-active database replication system. The system includes a plurality of nodes arranged in a master-slave configuration. Each node includes a database, wherein changes made at the databases of each node are replicated to the databases at one or more of the other nodes via a master node. One of the nodes is designated as the master node, and the remaining nodes are slave nodes. When a collision is detected during data replication between multiple nodes, the collision is resolved by a rule wherein if the collision occurs between the master node and one or more of the slave nodes, a change requested to be made to the databases at the one or more slave nodes by the master node is allowed, and a change requested to be made to the database at the master node by the one or more slave nodes is disallowed.

In another preferred embodiment of the present invention, collisions are identified in an active-active database replication system. The system includes a plurality of nodes arranged in a master-slave configuration. Each node includes a database, wherein changes made at each node are replicated to one or more of the other nodes via a master node. One of the nodes is designated as the master node, and the remaining nodes are slave nodes. A collision is identified during data replication between multiple nodes. The collision is responded to by using a rule wherein if the collision occurs between the master node and one or more of the slave nodes, a change requested to be made to the databases at one or more of the slave nodes by the master node is logged as allowed, and a change requested to be made to the database at the master node by the one or more slave nodes is logged as disallowed.

In another preferred embodiment of the present invention, collisions are minimized in an active-active database replication system. The system includes a plurality of nodes arranged in a master-slave configuration. Each node includes a database, wherein changes made at the databases of each node are replicated to the databases at one or more of the other nodes via a master node. One of the nodes is designated as the master node, and the remaining nodes become slave nodes. Collisions are minimized by using asynchronous replication from the master node to the slave nodes, and synchronous replication from the slave nodes to the master node.

In another embodiment of the present invention, collisions are resolved in an active-active database replication system. The system includes a plurality of nodes arranged in a network configuration. Each node includes a database, wherein changes made at the databases of each node are replicated to the databases at one or more of the other nodes via intervening nodes. A nodal precedence order is designated for each of the nodes. A collision is detected during data replication between multiple nodes. When a collision occurs between two or more nodes, the collision is resolved by using a rule wherein a change requested to be made to the databases at a lower precedence node by a higher precedence node is allowed, and a change requested to be made to the database at a higher precedence node by a lower precedence node is disallowed.

In another embodiment of the present invention, collisions are resolved in a database replication system. The system includes a source database and a target database, wherein changes made at the source database are replicated to the target database. Each database has one or more tables, and at least one of the tables has multiple constraints. A collision is detected during data replication as a result of one of the tables having multiple constraints. One constraint that contributes to the collision is identified. The constraint that contributes to the collision is relaxed, or the cause of the constraint that contributes to the collision is removed. The collision is resolved by repeating this process for all additional constraints that contribute to the collision.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIG. 1 shows a sample prior art Data Replication Engine.

FIG. 2 shows a two node cluster.

FIG. 3 shows a three node cluster wherein all nodes are connected to each other.

FIG. 4 shows a 3-node Route-Thru Architecture.

FIG. 5 shows an 8-node Route-Thru Architecture.

FIG. 6 shows a "1 Master, 2 Slaves" example.

FIG. 7 shows a "1 Master, 3 Slaves" example.

FIG. 8 shows an AutoLoader Transaction Management process.

FIG. 9 shows an Alternative Event/Transaction Identification Method.

FIG. 10 shows an AutoLoader/Consumer Restart Logic method.

DETAILED DESCRIPTION OF THE INVENTION

Figure 11:
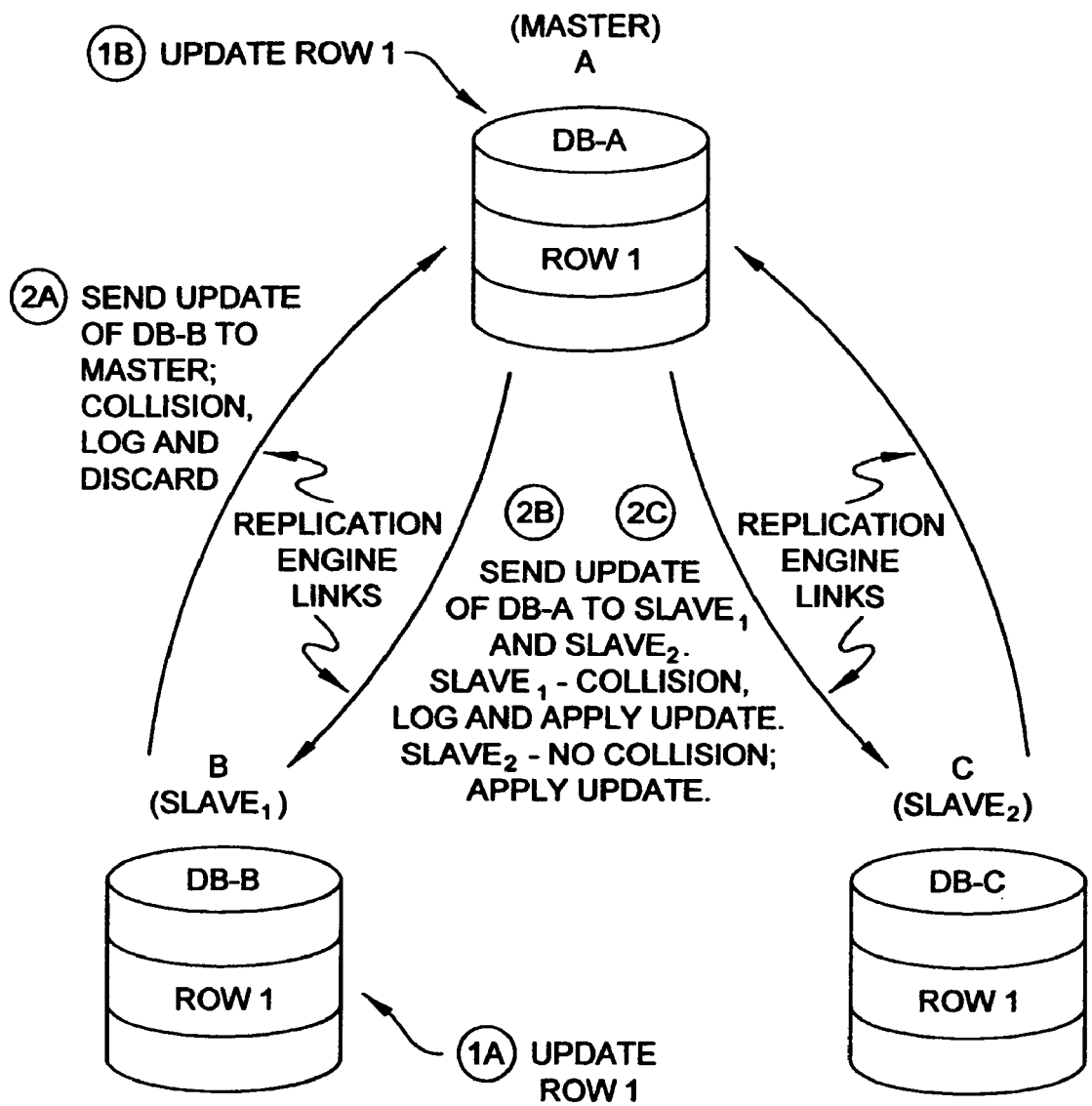
FIG. 11 shows a Master/Slave Collision.

Certain terminology is used herein for convenience only and is not to be taken as a limitation on the present invention.

Table of Contents

1 Introduction 1.2 Sample Replication Engine 1.2.1 Architecture 1.3 Background 1.3.1 Individual Event vs Transaction Data Collisions 1.3.2 Transaction Steps and Procedural, or Operation-Oriented, Replication
1.4 Nodal Loss Recovery
1.5 First to Update the Master Database Wins Rule
1.5.1 Asynchronous vs Synchronous Replication for the First to Update the Master Wins Algorithm
2 Duplicate Key Errors and Other Constraint Processing Issues/Collisions
3 Event or Transaction Identification Algorithms
3.1 Background
3.2 The Design
3.3 Startup/Restart Scenarios
4 Miscellaneous
4.1 The Shadowbase Audit Trail "Auto Advance" Feature
4.2 Split Mirrors for Change Queues (e.g., Audit Trails)
5 References
5.1 Breaking the Availability Barrier; Survivable Systems for Enterprise Computing
5.2 BiDirectional Database Replication Scheme for Controlling Ping Ponging
5.3 Collision Avoidance in Bidirectional Database Replication
5.4 Synchronization of Plural Databases in a Database Replication System 1 Introduction The disclosure below defines the design and implementation of the so-called "Master/Slave" feature enhancement to the Shadowbase® data replication engine (commercially available from Gravic, Inc., Malvern, Pa.) for enabling active-active applications (a copy of the application, and possibly the database, exists on each environment (which can be a separate, distributed node)). The marketing name for this feature is "High Availability Designated Winner", or "HADW" (the "designated winner" is the master environment, with all the other environments being "designated losers", or slaves, when collisions occur between them and the designated winner).

In the master/slave design, one database is designated the "master," and all other databases are designated a "slave." There can be as many slaves as are needed to handle the application load/transaction volume, locality requirements, etc. In general, there will be at least one slave for disaster recovery, on-line upgrades, zero downtime migrations, and load-balancing purposes. A failed master node can be replaced by promoting an available slave. The promotion can of course be manual or automatic (see below).

The purpose of this architecture is for all application database changes to be synchronized across all the database copies, without requiring any application changes. In fact, the application is not even aware that replication is configured and that it is running in a master/slave environment (see section 1.2 for a sample replication engine architecture).

In this architecture, asynchronous replication is used between the nodes (variants on this theme are discussed below). This is why data collisions can occur—the replication latency from when a change is made on one database to when it is propagated and applied to the others allows for a simultaneous change to occur at one of these other databases, called a database collision.

Any application copy can generally update any data item. This greatly facilitates load balancing of the user requests across all of the available nodes (i.e., perhaps send new incoming requests to the least loaded node). This means that data collisions can occur (the same record being updated simultaneously on more than one database), and need to be reconciled automatically by the replication engine. In the master/slave design, all databases will converge to the master's copy of the data, hence changes made at a slave that result in collisions with the master may be logged and discarded (the master/slave algorithm that allows this to work is sometimes referred to as the "the first to update the master wins" rule). More specifically, when asynchronous replication is used, the databases will diverge when a data collision occurs, and then be forced back into convergence by the HADW algorithm.

For simplicity, the discussion below assumes that each application copy resides on its own node with its own local copy of the database. Although not required, this architecture is generally the most common.

1.2 Sample Replication Engine

For background purposes, a sample replication engine is described below. U.S. Pat. No. 6,122,630 (Strickler et al.), U.S. Pat. No. 6,662,196 (Holenstein et al.), and U.S. Pat. No. 6,745,209 (Holenstein et al.), each of which are incorporated by reference herein, further define such an engine and describe additional replication engine architectures.

1.2.1 Architecture

A typical replication engine architecture is shown in FIG. 1. It comprises the following components:

1. Change Queue: The Change Queue contains a record of all changes made to the source database. It may take one of many forms:
   a. the redo log (or audit trail) maintained by the source system's transaction manager.
   b. a change log maintained by the application.
   c. a change log maintained by the replication engine, in which changes are obtained, for instance, by intercept libraries inserted into the application or by triggers inserted into the source database.

In most cases, the Change Queue is persistent (e.g., disk based) to protect changes in the event of a failure.

2. Extractor: The Extractor extracts changes (individually or in bulk) from the Change Queue and sends them to the target node(s).

3. Network: The network is used to send changes (either individually or in bulk) from the source node to the target node(s).

4. Database of Change: In some replication engines, incoming changes at the target node are first stored in a persistent store (typically disk and called a Database of Change, or DOC) to support recovery and to help in organizing the flow of changes to the target database, or to hold the changes for transactions until they either commit or abort—the applier could then be configured to then selectively only replay committed transactions. In other implementations, changes are sent directly to the Applier. There is no DOC in these cases.

5. Applier: The Applier receives changes from the DOC or directly from the Extractor over the network. It organizes changes into the proper order (if needed) and applies or replays them to the target database.

6. Ready-to-Commit: This is one method that can be used to implement synchronous replication, see reference 5.3 for more information.

There are many forms of replication engines that are variants of this architecture. For instance, there may be a source-side DOC, the Applier may be on the source node, the Extractor may be on the target node, the Extractor and Applier may be combined and be on either side of the network, and so forth.

1.3 Background

The form of replication generally used in the master/slave design can be referred to as Active-Active Absolute Hierarchical. The purpose of this form of replication is to keep two or more copies of the database synchronized, when each (or more than one) copy of the database is being updated by application(s). This form of replication has been implemented in the Shadowbase data replication engine.

It is useful when there are multiple copies of an application, each working on its own (or a shared) copy of the database, when there is more than one copy of the database available. Usually, there is one copy of an application working on one copy of a database, and that application and database are usually on a separate node, but this is not required.

This means that this form of replication works as follows:
1. Active-Active replication—the application is active on all nodes (active in this sense means that the application can process database change requests), with each node generally having its own copy of the database, although there may not be a database at each node.
2. Absolute replication—depending on the node "type" (see below), apply the source's "after image" over the "target image", i.e., not relative replication; this means that the target record is made to match the source record (depending on the node type as defined below). Relative replication (adding or merging the source's field deltas to the corresponding target image fields) can also be used to resolve collisions, however only absolute replication implementations will be discussed below.
3. Hierarchical replication—a node precedence order that determines the winner and loser when a data collision occurs between the two nodes (the winner's changes are kept, the loser's changes are logged and discarded). Master/Slave refers to a specific precedence order (1 master, 1 or more slaves, with the master having a higher precedence than the slaves and the slaves all having the same precedence), the more general form of this algorithm (discussed below) supports a nodal precedence hierarchy where each node has an assigned priority such that when a collision occurs between two or more nodes the node with the higher priority wins (in the case of multiple nodes with the same priority other factors can be used to resolve the winner, such as the earliest to make the change to their database, etc). For a master/slave environment, in the case of a collision involving two or more slaves (without a master), a race condition occurs; in this case, a deterministic algorithm needs to be selected to pick the winner, and in the HADW algorithm the winner is defined as the slave that is the first to update the master's database (see below).
4. Asynchronous replication (i.e., not synchronous replication). This means that data collisions may occur because each database copy is updated independently of the other (the application modifies its copy of the database, the replication engine is then responsible for replicating this change to the other database copies, resolving any collisions that it detects in a deterministic manner). Subsequent sections will discuss how synchronous replication can also be used to implement an HADW solution.

A data collision is defined as two or more copies of the application changing the same data item in different copies of the database at the same time. When a collision occurs, one needs to determine how to resolve it, i.e., which copy to keep and how to resynchronize the databases again. The HADW solution to these issues will be discussed below.

To implement this form of replication, one needs to define a "winner" (or master) and a "loser" (or slave) for when collisions occur on each replication link (a replication link connects two database copies, either directly or indirectly). More specifically, when a link connects two nodes A and B, the decision could be that A always beats B (overwrites B's changes) when collisions occur. In this case, one can say that A has a higher precedence, or priority, over node B.

Furthermore, for a 3 node configuration such as A, B, C, node A takes precedence over node B which takes precedence over node C (this relationship can be extended to n application and database environments). Thus, A wins when a collision between nodes A and B occurs, A wins when a collision between nodes A and C occurs, B wins when a collision between nodes B and C occurs, and A wins when a collision between all nodes A, B, and C occurs.

The precedence, or priority, of which node wins in the event of a collision can be statically assigned (or dynamically determined) based on many factors, such as the largest or more powerful node wins, the node closest or farthest from a point (such as the corporate main office) or another node wins, the least or most busy or the least loaded or most loaded node wins, or the pre-assigned precedence or priority order wins. For simplicity sake, the pre-assigned precedence order will determine the collision winner, with the higher precedence (or higher priority) node winning the collision over the lower precedence (or lower priority) node(s). Lower and higher precedence are meant to be used interchangeably with lower and higher priority in the discussion below.

This form of replication requires each link to be able to decide who wins when a collision occurs on it. Since each link connects two environments, and one can define the precedence between these two environments, one can define a master/slave relationship on that link (who wins and who loses when collisions occur).
1. The master to slave link, or master→slave link, is for sending data changes from the higher precedence environment to the lower precedence environment.
2. The slave to master link, or slave→master link, is for sending data changes from the lower precedence environment to the higher precedence environment.

For a master→slave (master/slave) link, the master always wins—always make the slave database look like the master database (accomplished by a method sometimes referred to as "fuzzy replication", see below). This means that:
1. Inserts are sent and applied; duplicate key errors mean a collision has occurred and map the Insert to an Update and reapply it (I—U→Shadowbase's UPDATEDUPLICATE ON).
2. Updates are sent and applied; not found errors mean a collision has occurred and map the Update to an Insert and reapply it (U→I—Shadowbase's INSERTNOTFOUND ON).
3. Deletes are sent and applied; not found errors mean a collision has occurred and the Delete is discarded (the target database already matches the source's database).

Note #1—In the cases above, it is often beneficial to send the source's before image (or an indicia of the before image such as a checksum or CRC) along with the source's after image. This is to check for collisions in the Update and Delete cases where the source's before image (or indicia) is compared to the target's disk image (or indicia). If the same, no collision has occurred—apply the incoming event. If different, a collision has occurred—take action as described above when a collision occurs (i.e., apply the master's change to the target database for master→slave links).

Note #2—The disk image is usually read (and possibly locked) when the change arrives from the source for this comparison. If they are the same, no collision has occurred and the incoming event is applied as-is; if they are different, a collision has occurred and one can optionally log the losing change and apply the winning change.

Note #3—It is often beneficial to log the information for a collision so that the customer can review/resolve the issue later on—for example, in some implementations the collision will be resolved (via applying the changes to the database) whereas in others the collisions will be identified and logged as allowed or disallowed using the rules described herein. In the either case, the ultimate goal is to make sure the databases still converge. Shadowbase has implemented the "Reject File" subsystem for this purpose (records information about collisions, including the losing change).

For a slave→master (slave/master) link, one only updates the master database if no collision has occurred; else the change is optionally logged and then discarded. This is generally accomplished by comparing the slave's before image to the master's disk image (or indicia, such as a CRC, of the images), and if the same allow the update to proceed, else optionally log and discard it as a collision. This means that:
1. Before images (or indicia) need to be sent (Shadowbase's BEFOREVALUES ON).
2. Inserts are sent and applied; duplicate key errors mean a collision has occurred (the target record already exists) and are discarded.
3. Updates are sent and applied ONLY if the target image matches the source before image, else a collision has occurred and they are logged/discarded; not found errors mean a collision has occurred and are discarded.
4. Deletes are sent and applied ONLY if the target image matches the source before image, else a collision has occurred and they are logged/discarded; not found errors mean a collision has occurred and are discarded.

Note #1—It is often beneficial to log the information for a collision so that the customer can review/resolve the issue later on—for example, in some implementations the collision will be resolved (via applying the changes to the database) whereas in others the collisions will be identified and logged as allowed or disallowed using the rules described herein. In the either case, the ultimate goal is to make sure the databases still converge. Shadowbase has implemented the "Reject File" subsystem for this purpose (records information about collisions, including the losing change).

Some multi-node environment examples follow. Each is referred to as a network configuration (or node configuration or cluster configuration), i.e., there are nodes or database environments with a communications path between them that replication uses to keep the databases synchronized.

Refer to FIG. 2 for a two node configuration (also referred to as a "cluster"), with nodes A and B.

If A is the master:
  i. The (replication) link(s) from A→B are master/slave.
  ii. The (replication) link(s) from B→A are slave/master.

For a three (or more) node cluster, the architecture is more complicated because there are more choices as to how to connect the nodes (see FIG. 3). It turns out that if all nodes are directly connected to each other (i.e., A↔B, A↔C, and B↔C), the hierarchy principle (A precedence over B, B precedence over C) needs to consider that the changes from A has multiple paths to get to node C (e.g., A→C directly, and A→B→C indirectly). When and if a collision occurs, say between node A and node B, the changes made at node A need to be kept at node C and not overwritten by the changes made at node B (in other words, node B's changes lose at all nodes and node A's changes win at all nodes).

One way to enforce this rule is when one can guarantee that the changes made at node A replicate to C "slower" than (or after) the simultaneous changes made at B replicate to C (i.e., for 3 or more node clusters, the changes at a higher precedence node need to replicate to a lower precedence node slower than a conflicting simultaneous update made to that other lower precedence node). Alternatively, instead of replicating more slowly, the changes need to carry an indicator of the source node, so that each colliding change can have its precedence evaluated against the target database's precedence to determine if the change should be applied or logged/discarded.

Methods to insure that one replication path is slower than another include comparing the time-stamps of the incoming events on the two links and applying the changes in ascending timestamp order; another is adding a time delay delta to the higher precedence link such that it guarantees that any changes made to the lower precedence node for the colliding data are applied prior to the higher precedence changes.

Because of this requirement, a simplified, preferred algorithm described below will generally not consider that all nodes are directly connected. Instead, consider first a precedence hierarchy using a route-thru approach, which shows intervening nodes, as shown in FIG. 4. In this example, A and C are "end" nodes, and node B is an intervening node (intervening nodes are not end-nodes, i.e., data must flow thru them from their adjacent nodes to reach the other nodes in the configuration). This route-thru architecture is also referred to as a nodal chain—in this instance, there are 3 nodes in the chain.

In this case, A can be assigned a higher precedence than node B, which has a higher precedence than node C. The links from A→B and B→C are master→slave, and the links from B→A and C→B are slave→master.

This route-thru design means, however, that multi-node architectures have additional issues—end-to-end replication latency increases as the changes are propagated, and a loss of any non-end node means the chain is broken/fragmented (end nodes, or nodal chains, may become isolated), which can lead to the so-called split-brain problem (split brain refers to the database divergence that can result when 2 or more isolated chains are allowed to continue processing user data changes, as the database in each isolated chain can diverge from the databases in the other isolated chains).

For example, FIG. 5 shows an 8-node cluster having nodes A . . . H connected as follows: nodes A and H are the end-nodes, with nodes B, C, D, E, F, G being intervening nodes.

If an end-node is lost, the chain remains linear with all remaining nodes still able to communicate with each other, albeit thru the intervening nodes; however, if an intermediate node is lost, two sub-chains of nodes will remain which must be dealt with as either a split brain processing issue (assuming users remain connected to both sub-chains and the databases between the chains are allowed to diverge) or all users are connected to one of the sub-chains (the other sub-chain remains dormant until the chain is fixed).

Hence, one will generally consider implementing a master/slave precedence architecture where there is only one master and one or more slaves, connected in a tree architecture as shown in FIG. 6. In the 3-node example below, A is the master node and B and C are the slave nodes:

The slaves (B and C in this example) are NOT (logically) connected to each other (however, they may be physically connected to each other). Data changes must first flow to the master and be successfully applied before flowing to the other slave(s). Adding new slaves adds additional leaf nodes, all logically hung directly off the master (they can be hung off other slaves, however this increases replication latency and is generally less desirable). All changes made to the slave nodes (B or C above) must first update the master node (A above) using the "first-to-update-the-master-database-wins" algorithm (see below), then get routed thru to the other node(s), generally in parallel to reduce the latency of propagating the change. This architecture keeps the replication tree flat—at most two replication hops are needed from a node to reach all other nodes.

In the four-node example shown in FIG. 7, A is the master, and B, C, D are 3 slaves. As noted above, additional slaves will generally be added at the same tree level as the other slaves (however, in an alternate embodiment, they could be added at a higher or lower level than an existing slave, whereby the existing slave has a lower or higher precedence than the newly added slave). The discussion below will assume that all the slaves are added at the same level directly underneath the master node.

When a change is made to a slave's database and is propagated to the master, depending on the application's behavior, that change may need to be propagated back to the sending slave (in addition to all of the other slaves) when the master's database is updated. Upon receipt at the original slave node, that change can then be discarded if the slave's database already matches the incoming change (this is true in the general case as well—if a source's incoming database change already matches the target database, that change can be discarded).

The "pong" of these slave changes back to the originating slave node helps eliminate certain race conditions that may result in database divergence if left untreated. For example, if the application allows a record to be updated at a slave node B at the same time as a delete of that same record can occur at slave node C, and the delete arrives at the master node A first, the delete will be propagated and applied to node B, and the update will be propagated to the master node A and applied, then propagated to node C and applied. In the end, node B won't have the record and nodes A and C will—a database divergence that is clearly incorrect. These and other similar database divergence conditions can be avoided in these instances if all master database changes are replicated to all slaves (including the slave that sent the change).

Similarly, another case of database divergence can occur in certain application situations when a "no-operation" update occurs (a no-operation update is an update where the application overwrites a record with the same values). In these cases, one can avoid the divergence if the target record is compared to the incoming source's after image values and if they match, the update is discarded and not applied.

1.3.1 Individual Event vs Transaction Data Collisions

Throughout this disclosure, data collisions are resolved using the master/slave algorithm. These are generally discussed and referred to as single I/O events that are colliding. Whereas this is certainly an acceptable method for many master/slave implementations, others require that the data collision be viewed and processed at the transactional level, i.e., this algorithm is also meant to cover the more general case where one or more I/O's inside a transaction collide; then, the decision on which to keep and which to discard is made at the transaction level (for all events inside that transaction) rather than just at the event level. Hence the general logic for how to handle a collision for an event for either link type is then extended to how to handle all the events inside the entire transaction.

For example, when a collision occurs on a slave→master link, the decision must be made on whether to simply discard the individual event that collided or to discard the entire transaction that contained the one or more event(s) that collided. This will largely be an application-driven decision: master/slave will make sure the databases converge, this decision will make sure they converge to the correct, and/or referentially consistent, values from the application's perspective.

When the decision is made to discard an entire transaction, all unapplied events for it can be discarded and that transaction can be aborted to undo all the effects of it. Depending on the application's behavior, this also may require a key-replay sequence (as defined below) for all events in the aborted transaction to make sure the slave's database(s) converge back to the master's values.

1.3.2 Transaction Steps and Procedural, or Operation-Oriented, Replication

Replication environments normally replicate the events that change the source database and apply them to the target database. Depending on the replication engine architecture, this same approach holds for the transactions that contain the transaction events or steps.

Throughout this disclosure, whenever replicating events or transactions is discussed, replication environments that replicate procedures or operations are also being referred to (a procedure is a command sequence such as DELETE ALL ROWS or UPDATE ACCOUNT_BAL BY 10% WHERE TITLE="Manager"). That is, instead of replicating the individual event records/rows that changed, replicate the operations instead.

An alternative embodiment of the master/slave algorithm would replicate these procedures in addition to or instead of the events and/or transactions.

1.4 Nodal Loss Recovery

When a node (or the network to that node) is "lost" (inaccessible, etc), the processing needed to resynchronize depends on the length of the "outage". If the outage is short, i.e., the network between two or more of the nodes is down for a short time, no special action needs to take place—changes that occur at the local nodes queue to be sent to the other node(s), and when the links are restored, the changes are sent and the queue(s) drain. This, in effect, is treated as a case where the replication latency has increased, and all of the master/slave processing remains the same.

If however, the outage is "too long" (e.g., too much data needs to be queued thus exhausting the queue space), or is not recoverable (e.g., a node is destroyed in a fire), the following approaches can be used.

In the master/slave architecture, loss of any slave (leaf) node is straightforward—basically, add in a replacement node, start the master replicating to it, and then use a method, perhaps via an on-line loader such as the Shadowbase Auto-Loader, to synchronize the slave's database to the master's database. Once this completes, the slave's database is synchronized and the slave is ready for receiving and processing its own application transactions.

Loss of the master is more complicated—it means a new master will need to be assigned. Basically, this means that once a new node is selected (which could be an automatic process based on various indicia such as node locality to users, site location, or processing power), the configurations will need to change at all nodes so that all the links are re-designated as master→slave (for master to slave connections) or slave→master (for slave to master connections) to reflect the new assignments.

At this point, all of the replication threads should be restarted using a date/time prior to when the original master was lost at a point earlier than the last replication point (i.e., reset the replication starting point so that all nodes will converge to the new master's database). This will force all the databases to resync to the new master's database (although that won't necessarily be the latest value of all the records, the databases will converge to the master's values and any collisions will be logged for later review/recovery). Alternatively, once the new master is chosen, the database at each slave could be purged and the master could flush or load all of its database values (or those that can change) to the slaves to force them into synchronization.

1.5 First to Update the Master Database Wins Rule

The First to Update the Master Database Wins rule refines the general multi-level precedence algorithm for environments with a single master and one or more slaves, as it eliminates the uncertainty caused by race conditions that certain architectures have when deciding which changes to allow and which to discard.

More specifically, this rule determines which slave changes are allowed to be applied to the master database (master changes are always applied to the slave's database). It is used to keep the slave and master databases synchronized when data collisions occur. It only applies to the replication engine's changes; a local (or remote) application that changes a database always "wins", i.e., the application's changes are always applied (they may be backed out, or "undone", if they collide with another application's changes to a remote copy of the same record, as discussed below).

This rule works as follows:

1. One node is designated the "master" node. This database is the "convergence" database. When changes are made to the master's database, all other databases will eventually converge to the same values in the master's database. This is accomplished by sending the changes that are made to the master's database to the slave databases and applying them (i.e., force the slave's database to match the master's by applying the incoming I/O and mapping it as necessary (hence, "fuzzy replication", as defined above, is used to make the slave's database match the master's)). In other words, the replication links from this node follow the master→slave rules described previously.
2. All other nodes are "slave" nodes. Application changes to the slave node's database are sent to the master node's database, and if no collision has occurred, they are applied. If a collision has occurred, the slave's change is discarded and optionally logged in a Reject File as a collision, and the slave's node will re-converge back to the master's database value (the I/O that was applied to the master's database that caused the collision at the master is in the process of being sent to that slave to replace the slave's change and make the slave's database re-converge back to the master's value). In other words, the replication links from this node follow the slave→master rules described previously.
3. At start-up/system initialization time, the master and slave databases start out synchronized (e.g., all empty or at the same set of database values). If they are not synchronized, they need to be synchronized via a technique such as the Shadowbase AutoLoader (the AutoLoader synchronizes a target database to match the source's database while replication can be active) or another technique, such as performing a "share" load and then replaying the accumulated changes after the load completes.

Typically, the method used to do the initial synchronization will be to start out with an empty slave database, file/table, or key-range, and use the AutoLoader or similar function or perform a load of that information from the master to the slave (the technique allows for a specific slave to be loaded singly, or any number of slaves to be loaded in parallel, simply by using the configured replication architecture and the "transaction identification" technique described later).

If the master needs to be synchronized to a slave, the AutoLoader and the Shadowbase replication engine will make sure that the AutoLoader's changes are applied to the master and then propagated to all slaves. This means that the load data coming from the slave to the master is temporarily treated as if the link is a "master→slave" link so that the master is forced to synchronize to the slave's database (see below).

All slaves are (logically) connected to the master, the slaves are not directly connected (for replication purposes) to each other. Changes made at the master are generally sent to all slaves in parallel (for replication efficiency and reduce replication latency to minimize collisions). Changes made to a slave are sent to the master first; if they "win" and are applied to the master's database (i.e., no collision has occurred), they are then sent to all slaves in parallel (optionally including being sent back to the slave that originated the change (as described earlier)).

1.5.1 Asynchronous vs Synchronous Replication for the First to Update the Master Wins Algorithm The First to Update the Master Wins algorithm discussion above assumes that all of the replication links are asynchronous, i.e., the changes made to one database (master or slave) complete immediately without waiting for any of the other database(s) to be updated. More specifically, application changes made to a database complete as soon as the application applies them, and are subsequently sent/applied to the other database(s) using the First to Update the Master Wins algorithm. The application on any node is not held up waiting for the changes to be replicated and applied.

In an alternative embodiment, certain advantages can be gained if the replication from the slaves to the master is synchronous, with the replication to the slave(s) remaining asynchronous. Using this approach, the changes that an application at a slave makes to the slave database do not complete until the master's database is also (successfully) updated; if the master's database cannot be updated (e.g., due to a collision), the slave application is told that its database change cannot be applied and the original value of the slave's database change is recovered. The slave application can then decide what to do—this may mean it tries again after a delay period, or it may abort its transaction and alert the user (who can then try again).

Replication from the master to all slaves can remain asynchronous, as this causes the least application impact on the master and generally improves application latency (see reference 5.1).

The benefits to be gained by this approach are that collisions are avoided between a slave's database change when applying it to the master, and depending on the application's behavior the master may no longer need to pong a slave's changes back to that originating slave as its database has already been updated to match the master's (indeed, it was the slave's synchronous change that set the master's database to this value). In other words, using synchronous replication from the slave to the master causes the slave to "win" in the master's database for synchronous changes that are successfully applied.

See reference 5.3 for an example of synchronous replication methods.

U.S. Pat. No. 5,937,414 (Souder et. al.) discloses methods for providing database system replication in a mixed propagation environment. Souder et al. uses asynchronous replication as well as synchronous replication between multiple nodes. However, Souder et al. does not discuss this mixed asynchronous and synchronous replication in a route-thru architecture, using the collision avoidance and/or resolution strategies of the present invention.

2 Duplicate Key Errors and Other Constraint Processing Issues/Collisions

During replication processing, it is possible for the replication engine to get duplicate key errors (or other constraint-type issues and/or collisions) when applying replicated changes against a target database. A simple example is when a record with the same 'primary' key value is inserted into the same table on two nodes by the respective copies of the application, and a constraint exists on the database copies whereby the primary key must be unique on that table. Upon being replicated, the replication engine will detect that the second insert cannot be applied to the target database because it will violate the primary key uniqueness constraint for that table.

These types of collisions can occur in any replication environment where the applications are active on the source and target node (or source and target database copies), or perhaps where the target and source database's aren't initially synchronized, as well as the more advanced master/slave environments described earlier (in the case of a master/slave environment, the first to update the master database will win, and fuzzy replication plus the normal master/slave collision resolution logic is used to keep the databases synchronized).

Another type of duplicate key (or other constraint processing) error can occur when unique alternate keys/indices (both are used interchangeably in this disclosure) are used. In this case, the primary keys of two colliding records may not get a duplicate key error (because they are different); rather, a duplicate key error may occur on one or more of the unique alternate keys/indices. If this form of collision can occur for this application, the processing required is the same as that described above—the databases need to converge to the master's database values.

Several approaches exist to resolve these special types of collisions:

1. In one approach, a collision on a master→slave link will locate the offending slave record (or row)—the record preventing the insertion or update of the slave's record—via the offending key path (which may be the unique alternate key/index path), and delete it; this should allow the master's database change to be reapplied successfully (if the duplicate key error occurs again, the process is repeated). If the collision occurs on a slave→master link, the incoming slave's change is logged/discarded.
2. In another approach, a "deferred" key replay approach may also be used. In this approach, the incoming change may indeed be part of a "reversal" operation (some file systems allow base file inserts before index constraints are checked, hence the INSERT may result in an insert into the base file, followed by a duplicate key error on the index, followed by a reversing DELETE on the base file of the original INSERT). When this occurs, one can hold on to all I/O until the COMMIT arrives, matching up (via primary key) and discarding the reversed operations (if the transaction ABORTs, all events for the transaction are discarded).
3. Alternatively, one can simply discard the events that generate a duplicate key error on a unique index, and instead ask for a key-replay operation from the source—this will cause the discarded record to be resent from the source after this transaction completes, assuming that record still exists on the source (if it doesn't, the target matches the source anyway). In this approach, incoming events are processed and possibly discarded, with a key-replay event being circulated back to the source asking for the record to be resent (e.g., as either an INSERT or an UPDATE). Care must be taken if using this latter approach to avoid a cyclic infinite look of discarding/replaying the event, perhaps by maintaining a counter of cycles and discarding events that loop around more than once, or by using a technique such as the "event or transaction identification" approach described below (i.e., mark replayed events using this technique and if they cause the same issue on replay log and discard them).
4. Alternatively, a combination of each of the approaches may be used, particularly for master→slave links. In this approach, incoming I/O's that cause duplicate key collisions on unique alternate key files/indices generate key replay events that are sent back to the master (this avoids having to determine if the error was caused by an event that will later reverse as part of this transaction). When the key replay occurs, the master will send the record to the slave (if it has it, if not it was ok to discard the original I/O). When the replayed record arrives at the slave, it is identified as a key replay event; this time when the record is applied, if a duplicate key error occurs on the unique alternate key file/index, the offending (blocking) record is deleted from the target database and the I/O is retried. This sequence is repeated until applying the replayed event is successful.

3 Event or Transaction Identification Algorithms

At times it is advantageous to identify certain information about an event or a transaction (which are sometimes referred to as event or transaction attributes), such as the origination/source of it, the user id or user name or process id or process name that created it, the transaction initiation or start time, the terminal or device that initiated the transaction (or from where the transaction was initiated from), or other information such as whether that transaction ultimately commits or aborts (even before the commit or abort is received). For example, it is helpful at times to know what specific application, process, system, or user on the source generated an event or transaction during replication, as these attributes can be used to control the replication engine, and this information is often not otherwise available to the replication subsystem, particularly to the target replication applier components.

One example of when it is advantageous to know the application that generated a source event or transaction is when implementing the key-replay approach for resolving duplicate key errors on secondary indices as described above. When implementing this algorithm, the target replication engine components can identify what events and/or transactions in the replication stream are related, and take appropriate-action with them. For example, if it is clear that a specific event was generated by a specific application, and that application is well-known to require this data to be applied as it has been sent, there is no ambiguity of whether this event should be applied or could be discarded if it runs into a duplicate key error as described in section 2.

More importantly, using this algorithm and the technique described below, these event(s) or transaction(s) can be so identified without requiring any changes to the application, or the application event's record structure(s) or other aspects of the replication subsystem. This is of considerable value when the source and/or target event capture subsystem does not save or make this information readily available to the replication engine.

3.1 Background

One example use of this algorithm is for a master/slave environment. Regardless of the master→slave or slave→master orientation of a link, there are times when it is valuable to control the replication engine to override the default collision processing logic (i.e., the first-to-update-the-master-wins algorithm). For example, events replicated on a master→slave link will always make the target (slave) database reflect the master database's values. However, the default logic for slave→master links is to possibly log and to discard replicated events when collisions occur. This can be a severe limitation when trying to initially synchronize the databases where the slave's database needs to be loaded into the master's database (e.g., the master's database is empty or is out-of-date and needs to be synchronized to one of the slave's databases).

Another case where the default collision logic can be a limitation is when implementing the unique index duplicate key error recovery logic described above. Without the following technique, it is very difficult (if not impossible) to tell when a particular master's event should be applied or be discarded when it collides with a duplicate key error on a unique index; this is particularly true for those file systems that issue "reversing" events into the data capture mechanism when the original event fails (e.g., when a insert on a master database yields a duplicate key error on a unique index, some file systems will actually save the original insert followed by a "reversing" delete into the replication stream—in this case, it is acceptable to skip the pair of reversing events, or to discard them if they run into the same errors on replay at the target—in other words, do not make the slave database look like the master's during the transaction, only after the transaction completes).

For master→slave links, certain helpful Shadowbase DBS settings are or will be available (as described above). All updates that arrive from a master to a slave are applied into the slave's database regardless if a collision has occurred, and UPDATEs are mapped to INSERTs or vice versa when needed. Hence, AutoLoading a master to a slave is fully supported via the default master/slave rules.

For slave→master links, the default master/slave logic is that the slave loses when there is a collision and the events that cause the collisions are discarded. Hence, when using the default master/slave logic, it is impossible to make a master database synchronize to a slave's database.

To overcome this limitation, the slave→master logic can be modified as follows:

Incoming events (and/or transactions) will be identified as either a "normal" event (e.g., an application's database change) or they will be tagged as a "special" event (e.g., a database change that originated in the Shadowbase AutoLoader). Hence, either the normal master/slave logic will be used (for normal events/transactions), or special logic will be used (for events/transactions so tagged). In this case, the special logic equates to implementing master slave link logic on the master side when these events/transactions are received from the slave and applied into the master's database (this will allow the slave to update the master's database when they are not initially synchronized, for example to force the master's database to synchronize to a slave's database).

A method that can be used to mark or tag events/transactions is described below.

3.2 The Design

The following pseudo code shows the basic algorithm for tagging events/transactions. In one implementation, these changes are made to the Shadowbase AutoLoader and the master/slave logic implemented in the Shadowbase consumer. The approach modifies the AutoLoader and the Consumer to add in an "AutoLoader Control File (ACF)". This file will basically hold information about the transactions used for the AutoLoaded data.

This file's records (one per AutoLoad process) will always appear in the audit trail prior to the data that was AutoLoaded, or will otherwise be made available to the target replication components prior to applying the incoming data that they refer to. The record will contain the transaction ID used for the next batch of AutoLoaded data. By monitoring this file, the target replication components will be able to see the transaction ID's that contain AutoLoader database change events (in this case, UPDATEs) before that transaction arrives and/or needs to be processed in the target replication components.

FIG. 8 shows a preferred embodiment of this method.

FIG. 9 shows an alternative algorithm for the identification of certain events or transactions.

FIG. 11 shows a combination event sequence/schematic diagram of a Master/Slave Collision.

Figure 12:
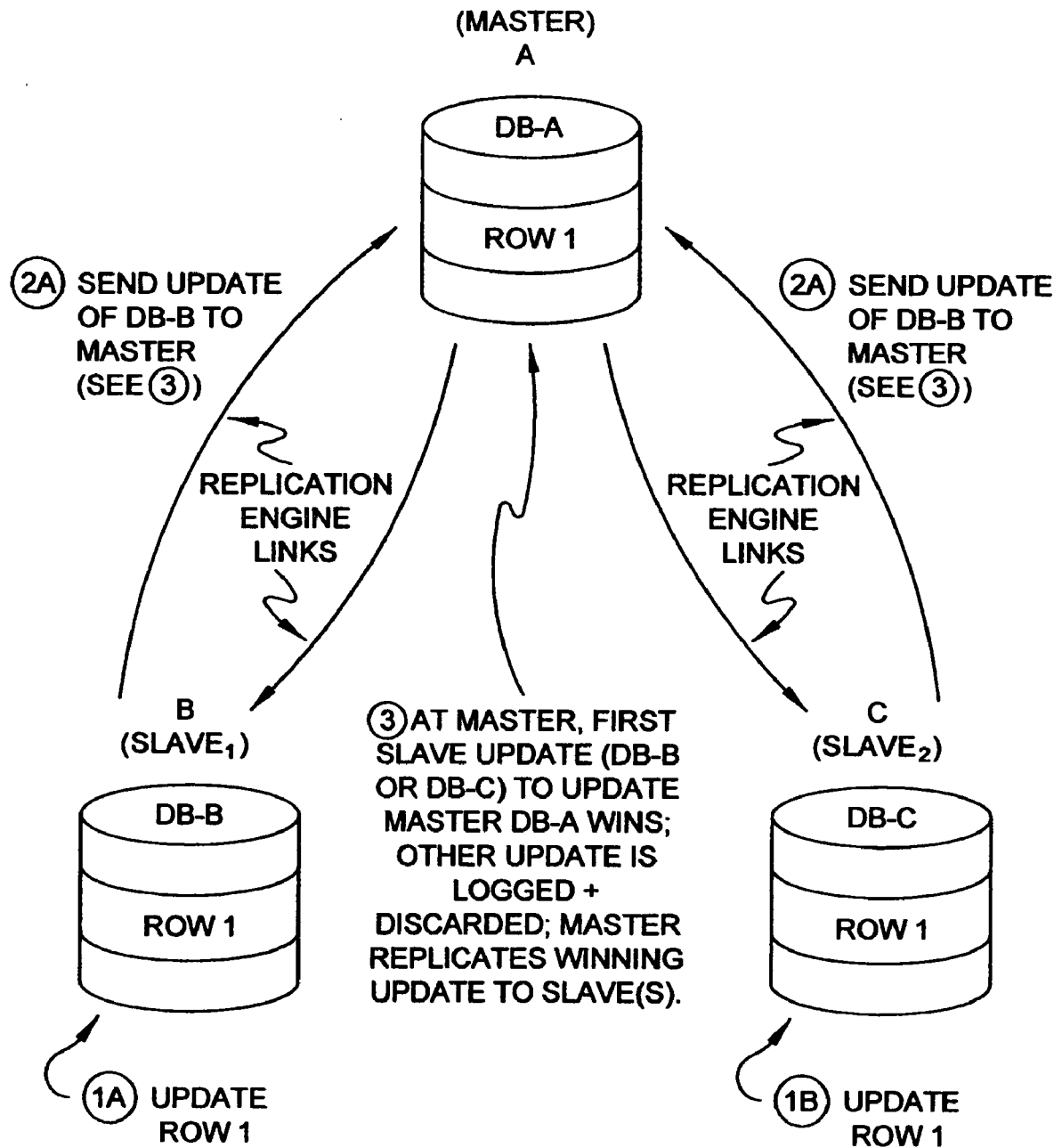
FIG. 12 shows a Slave/Slave Collision.

FIG. 12 shows a combination event sequence/schematic diagram of a Slave/Slave Collision.

Figure 13:
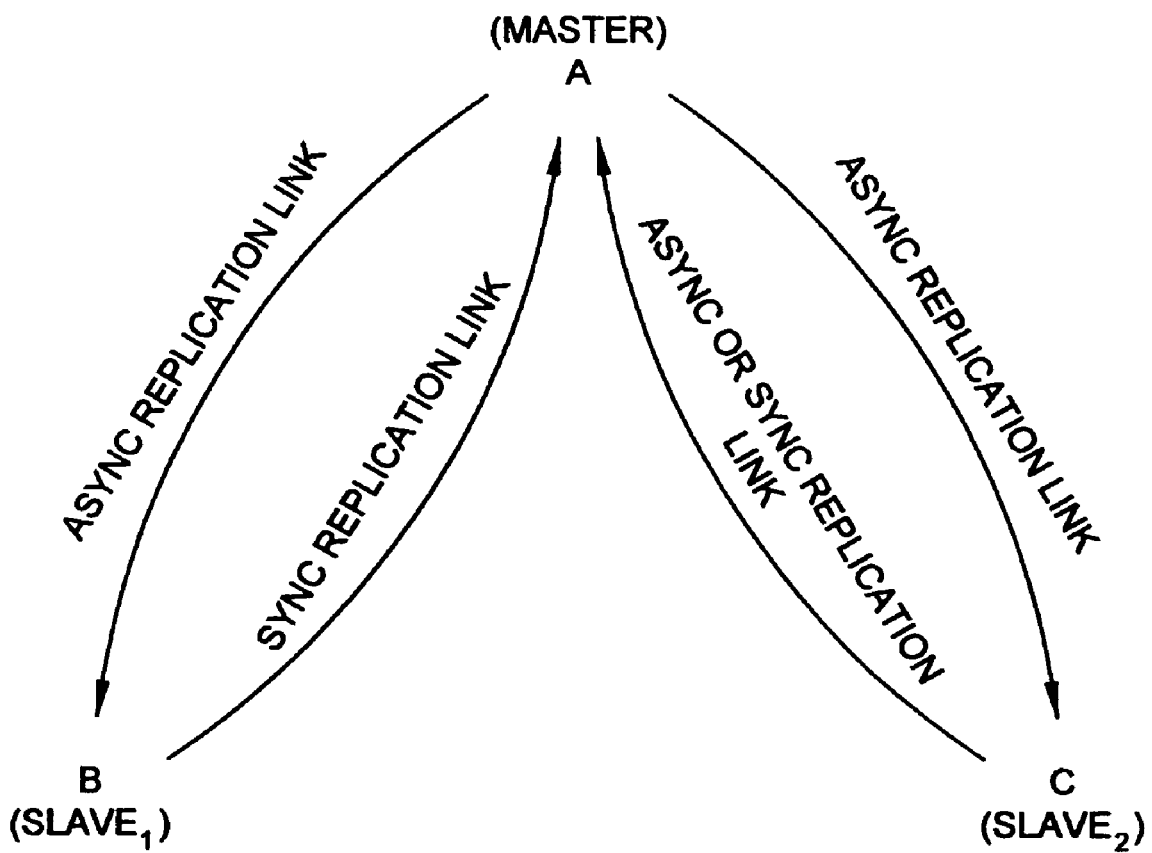
FIG. 13 shows Sync/Async Replication Links.

FIG. 13 shows data flow of Sync/Async Replication Links.

Figure 14:
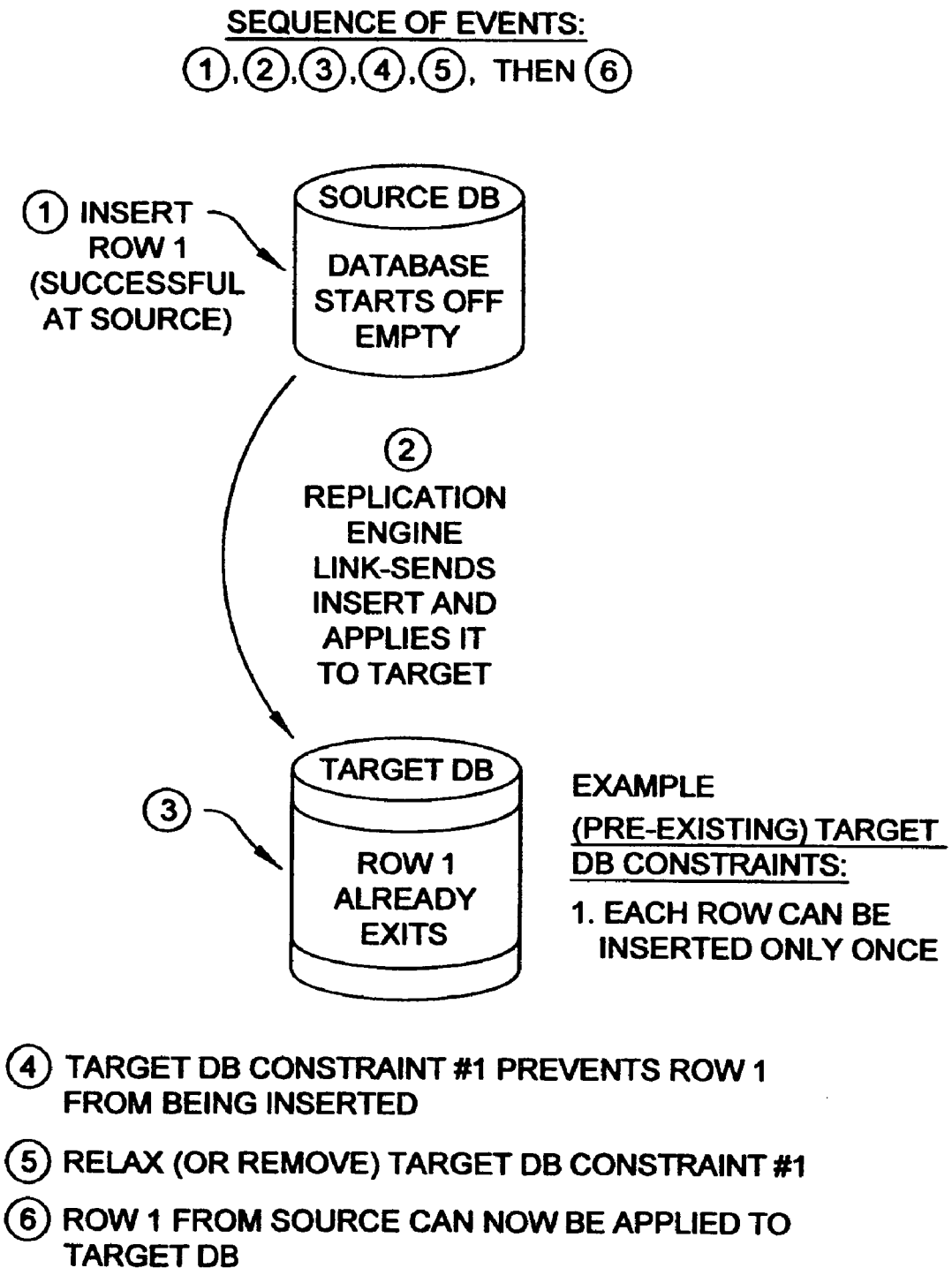
FIG. 14 shows resolving collisions via relaxing constraints.

FIG. 14 shows a combination event sequence/schematic diagram for resolving collisions via relaxing constraints.

In another embodiment of the present invention, the attributes or other identifying information can be managed and sent outside the change queue, for example they can be sent to the target replication component via interprocess messages, TCP/IP connections, file interfaces, or other communication approaches.

3.3 Startup/Restart Scenarios

As shown in FIG. 10, on startup, the target consumer reads the contents of the target side ACF file to get Tx ID's (this file is replicated from the source to the target just like any other database file). If there are any records in there, it loads those Tx's ID's and identifies them as AutoLoad Tx's into the appropriate list/AVL tree (these are cleaned out when commit/aborts occur, or perhaps after they have become 'stale' (i.e., they have been in the list/tree for 'too long' such that they could not possibly still be active in the source)).

For a startup/restart scenario, once the ACF is loaded into memory, the worst case is the consumer will process ONE transaction of AutoLoad data (the first one it receives), that had already been applied, without knowing it is AutoLoad data. But, since it had already been replayed, updating the master DB as appropriate, this is acceptable (alternatively, the TIDFILE feature within Shadowbase can be used to avoid replaying any transactions that have previously been applied).

Using this approach, events and/or transactions can be tagged/marked as 'special' when they are processed. This will allow the target to know when to apply the default master/slave logic versus when to apply the special logic on a replication link.

In a broader context, this tagging technique is particularly useful for alerting downstream replication components about oncoming event and transaction attributes when the processing environment does not otherwise support certain functions. For example, some transactional environments do not record the user id, date/time, and/or process name that started a transaction, and this information can often be useful to know for controlling how the replication engine processes those events or transactions. Via the tagging technique described above, one can capture and embed this information into the replicator's database change stream before the information that it refers to arrives and/or needs to be applied by the replication engine.

4 Miscellaneous

4.1 The Shadowbase Audit Trail "Auto Advance" Feature

The Shadowbase replication engine is designed, by default, to process all of the change queue data (in this case Transaction Monitoring Facility (TMF) audit trail data), in order, and never skip any audit trails. This is to guarantee that Shadowbase does not miss any of the data that could affect the database tables, and that it applies the changes in the proper "serialized" order that will guarantee that the target matches the source.

There are applications and situations, however, where skipping audit data in certain cases is acceptable. Often these users do not dump their audit data to tape or disk, rather they use TMF for simple business transaction atomicity (for example, many telco applications have databases with very high roll-over rates, and potentially missing some of the updates to these databases is ok because the data is often updated very frequently—if you miss this update, another is coming soon to replace it).

During processing of the audit trails, when the Shadowbase collector needs the next audit trail to process, it will generally search for it in the Shadowbase audit "scratch" subvols (see the collector ADTSCRATCHxxx params), and if not found then query the TMF catalog to find that trail. If the collector cannot find the trail anywhere (and TMF says it has been scratched or does not exist), it displays a message to the message notification system, or event management system (EMS), stating that it is waiting on an audit trail, and enters the "wait audit" state. After a 10 minute wait, it will check these locations again, and if not found report another EMS message and loop in this cycle indefinitely. This is the default mode to guarantee that the collector never "misses" any audit.

While the collector is in this state, both the STATS COLL and STATUS COLL commands will show which audit trail the collector is waiting on. The user can then take corrective action to fix the problem (e.g., restore trails, etc).

However, there may be situations when the user wants to modify this behavior, perhaps because they are not dumping their audit to tape (or disk) and a particular audit trail is no longer available (e.g., it rolled off the system and was not dumped). In these cases, the user can specify the following Tandem Advanced Command Language (tacl) parameters to AUDMON to instruct it to "skip ahead" past the missing audit and continue processing.

A few tacl params need to be defined first:
1. TACL param SBCOLLAUTOADVWAITS—a number that defines how many "wait audit" conditions before checking if the "auto advance" feature is enabled. The default is 2.
2. TACL param SBCOLLAUTOADVFACT—a number that defines how many FLUSH_BUSY intervals to go back when it is time to "auto advance". The default is 2.
3. TACL param SBCONSFLUSHBUSY—a number that defines how often a "peer consumer" will log its list of active transactions to its associated TRANSLOG.
4. TACL param SBCOLLAUTOADVMODE—when supplied and set non-zero, and an audit trail is missing for SBCOLLAUTOADVWAITS times, the collector will "auto advance":

0=disabled, the default mode—normal SB processing occurs (Shadowbase waits forever for the trail to be restored, reporting messages to EMS every 10 minutes).

1=When it is time to "auto advance", the collector advances to the point in time in audit using the current time minus (SBCOLLAUTOADVFACT*FLUSH_BUSY). This becomes the replication restart point. FLUSH_BUSY is 5 minutes by default if no SBCONSFLUSHBUSY tad parameter is present. Otherwise, FLUSH_BUSY is the maximum of 5 minutes or the value specified by the SBCONSFLUSHBUSY tad parameter. If configured for bi-directional replication, ping-pong should not occur in this mode (hence this should normally be the mode selected).

2=When it is time to "auto advance", the collector advances right to the "end of audit" (the EOF of the current MAT). This becomes the replication restart point. If configured for bi-directional replication, ping-pong could occur in this mode (see below).

If SBCOLLAUTOADVMODE is 1, the collector will read the last record in the master audit trail and establish this as a replication restart point. If no record exists yet, RBA 0 of the current audit trail is used as the replication restart point. The collector then subtracts a computed "go back interval" as defined above from the last modification timestamp of the current audit trail to determine a restart timestamp. It then uses a special function to identify the audit where this restart timestamp is located. The RBA of this record for the restart timestamp becomes the restart reading point—this is generally far enough back to pick up any TRANSLOG entries from the peer (return) consumers to build the list of transactions that should not be returned (to avoid ping-pong if in a bi-directional environment). The RESTARTFILE record is then updated with the restart reading point and data replication restart point. The collector then abends (fails)—this is by design—to force all active transactions on this thread to automatically abort. When the collector restarts, it will start reading from the restart reading point forward to pick up peer consumer TRANSLOG transaction id's, but will not start replicating until it hits the replication restart point (the record at the original end-of-audit point prior to the abend). If configured for bi-directional replication, this mode should avoid transaction ping-pong.

If SBCOLLAUTOADVMODE is 2, the collector will read the last record in the master audit trail and establish this as the restart reading point. If no record exists yet, RBA 0 of the current audit trail is used as the restart reading point. The data replication restart point is also set to this value. This information is then updated into the RESTARTFILE record. The collector then abends (fails)—this is by design—to force all active transactions on this thread to automatically abort. When the collector restarts, it will start processing audit at the established restart point. If configured for bi-directional replication, transaction ping-pong is possible in this mode (the database may be corrupted).

When an auto-advance sequence occurs, various messages are logged into the EMS subsystem, and a STATS COLL command will report that this has occurred.

When an auto-advance sequence occurs, data changes made to the source database will be lost (skipped) and the target database may not match the source database, potentially requiring a reload of the target database to re-synchronize it with the source database.

4.2 Split Mirrors for Change Queues (e.g., Audit Trails)

A disk mirror is a copy of a disk that is maintained with the same information as the primary disk. It can be one or more copies of the disk. Generally, the primary and the mirrors are all considered active, and writes to the disk mirror are done synchronously with writes to the primary disk, i.e., the write is not considered successful until it completes to both disks (the physical writes may be serial or parallel). If one of the writes fails, that disk is usually considered "down" if it cannot be recovered, with the other disks remaining available to satisfy other I/O requests.

Mirroring is a "sparing" technique designed to improve the availability of the disk (e.g., if the primary disk fails, the mirror can continue servicing requests with no data loss).

One replication technique to prevent data loss in the event of a nodal failure is to put the database's transaction logs (change queue logs) on "geographically split" mirrored disks. If these mirrors are located remotely from their primary disks, in the event that the primary disk is lost (e.g., due to a site failure), the remote mirror can be used to recover the database change queue.

Mirroring the database's change queue logs in this way is often beneficial as the durability aspect of the Atomicity, Consistency, Isolation, and Durability (ACID) properties of a transaction often mean that the change queue log information has been successfully flushed to disk before the transaction is allowed to complete.

In some database subsystems one can remotely locate the mirrors from the primary disks for all data disks (not just the change queue disks). This approach is often counter-productive, however, as it generally slows database performance and often the physical data disk does not contain an up-to-date image of the database due to database write caching algorithms. Hence, it is often not useful to remotely mirror the data disks (unless you disable write caching).

When a failure occurs at one site when using remote change queue mirrors, it is often valuable to access the surviving mirror from the target database's system directly and apply any of the changes that had not been successfully applied for completed transactions (i.e., those that had committed); all other transactions, including those that had not completed or that had aborted, are aborted (these are done in the order of the commit/abort transaction termination records in the change queue; any that are left incomplete at the end of the change queue were in process at the time of failure and are aborted).

One such architecture to leverage this concept would be to set up a replication environment for two nodes where the mirrors for each node are on the other node. In other words, for nodes A and B, A's split mirror is on node B, and B's split mirror is on node A. Then, in the event of a failure of either node, the split mirror for the other node is accessible and available to eliminate data loss. In this type of failure scenario, accessing the split mirror for the failed node directly from the surviving node is the most direct method to access the needed data.

5 References 5.1 Breaking the Availability Barrier; Survivable Systems for Enterprise Computing W. H. Highleyman, Paul J. Holenstein, Bruce D. Holenstein, "Breaking the Availability Barrier; Survivable Systems for Enterprise Computing," Author House; December, 2003

5.2 U.S. Pat. No. 6,122,630 (Strickler et al.) entitled: BiDirectional Database Replication Scheme for Controlling Ping Ponging.

5.3 U.S. Pat. No. 6,662,196 (Holenstein et al.) entitled: Collision Avoidance in Bidirectional Database Replication.

5.4 U.S. Pat. No. 6,745,209 (Holenstein et al.) entitled: Synchronization of Plural Databases in a Database Replication System.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for resolving collisions in an active-active database replication system, the system including a plurality of nodes arranged in a master-slave configuration, each node including a database, wherein changes made at the databases of each node are replicated to the databases at one or more of the other nodes via a master node, and wherein changes can be made at the database of the master node independent of a change request received from a slave node, the method comprising:
   (a) designating one of the nodes as the master node, the remaining nodes being slave nodes;
   (b) detecting a collision during data replication between multiple nodes; and
   (c) resolving the collision by using the following rule:
      (i) if the collision occurs between the master node and one or more of the slave nodes as a result of a change made at the database of the master node independent of a change request received from a slave node, a change requested to be made to the databases at the one or more slave nodes by the master node is allowed, and a change requested to be made to the database at the master node by the one or more slave nodes is disallowed.

2. The method of claim 1 wherein there are a plurality of slave nodes, and step (c) further includes the following rule:
   (ii) if the collision occurs between two or more slave nodes, a change requested to be made to the database at the master node by the first slave node to request a change to the database at the master node is allowed, and a change requested to be made to the database at the master node by the other colliding slave nodes is disallowed.

3. The method of claim 2 further comprising:
   (d) making the requested and allowed change to the database at the master node; and
   (e) replicating the requested and allowed change to the database at the master node back to at least the first slave node.

4. The method of claim 1 further comprising:
   (d) making the requested and allowed change to the database at the master node; and
   (e) replicating the requested and allowed change to the database at the master node to the one or more slave nodes.

5. The method of claim 1 wherein there are a plurality of slave nodes, and one of the slave nodes has priority over the other slave nodes, and step (c) further includes the following rule:
   (ii) if the collision occurs between two or more slave nodes, a change requested to be made to the database at the master node by the priority slave node that requests a change to the database at the master node is allowed, and a change requested to be made to the database at the master node by the other colliding slave nodes is disallowed.

6. The method of claim 1 wherein the database replication system further includes a replication engine, and steps (b) and (c) are performed by the replication engine.

7. The method of claim 1 wherein at least one of the nodes includes an application, the method further comprising:
   (d) at the nodes having an application, the application making the change at the nodes.

8. The method of claim 1 wherein steps (b) and (c) occur on a transaction basis.

9. The method of claim 1 wherein steps (b) and (c) occur on an individual transaction step or operation basis.

10. The method of claim 1 further comprising:
    (d) using synchronous replication from the slave nodes to the master node; and
    (e) using asynchronous replication from the master node to the slave nodes.

11. An apparatus for resolving collisions in an active-active database replication system, the system including a plurality of nodes arranged in a master-slave configuration, each node including a database, wherein changes made at the databases of each node are replicated to the databases at one or more of the other nodes via a master node, and wherein changes can be made at the database of the master node independent of a change request received from a slave node, the apparatus comprising:
    (a) means for designating one of the nodes as the master node, the remaining nodes being slave nodes;
    (b) means for detecting a collision during data replication between multiple nodes; and
    (c) means for resolving the collision by using the following rule:
       (i) if the collision occurs between the master node and one or more of the slave nodes, as a result of a change made at the database of the master node independent of a change request received from a slave node, a change requested to be made to the databases at the one or more slave nodes by the master node is allowed, and a change requested to be made to the database at the master node by the one or more slave nodes is disallowed.

12. The apparatus of claim 11 wherein there are a plurality of slave nodes, and the means for resolving the collision further includes the following rule:
    (ii) if the collision occurs between two or more slave nodes, a change requested to be made to the database at the master node by the first slave node to request a change to the database at the master node is allowed, and a change requested to be made to the database at the master node by the other colliding slave nodes is disallowed.

13. The apparatus of claim 12 further comprising:
    (d) means for making the requested and allowed change to the database at the master node; and
    (e) means for replicating the requested and allowed change to the database at the master node back to at least the first slave node.

14. The apparatus of claim 11 further comprising:
    (d) means for making the requested and allowed change to the database at the master node; and
    (e) means for replicating the requested and allowed change to the database at the master node to the one or more slave nodes.

15. The apparatus of claim 11 wherein there are a plurality of slave nodes, and one of the slave nodes has priority over the other slave nodes, and the means for resolving the collision further includes the following rule:
    (ii) if the collision occurs between two or more slave nodes, a change requested to be made to the database at the master node by the priority slave node that requests a change to the database at the master node is allowed, and a change requested to be made to the database at the master node by the other colliding slave nodes is disallowed.

16. The apparatus of claim 11 wherein the database replication system further includes a replication engine, wherein the means for detecting and the means for resolving are part of the replication engine.

17. The apparatus of claim 11 wherein at least one of the nodes includes an application, the apparatus further comprising:
    (d) means in the application for making the change at the nodes for the nodes having an application.

18. The apparatus of claim 11 wherein collisions are detected and resolved on a transaction basis.

19. The apparatus of claim 11 wherein collisions are detected and resolved on an individual transaction step or operation basis.

20. The apparatus of claim 11 further comprising:
    (d) means for using synchronous replication from the slave nodes to the master node; and
    (e) means for using asynchronous replication from the master node to the slave nodes.

21. A method for identifying collisions in an active-active database replication system, the system including a plurality of nodes arranged in a master-slave configuration, each node including a database, wherein changes made at each node are replicated to one or more of the other nodes via a master node, and wherein changes can be made at the database of the master node independent of a change request received from a slave node, the method comprising:
    (a) designating one of the nodes as the master node, the remaining nodes being slave nodes;
    (b) identifying a collision during data replication between multiple nodes; and
    (c) responding to the collision by using the following rule:
       (i) if the collision occurs between the master node and one or more of the slave nodes as a result of a change made at the database of the master node independent of a change request received from a slave node, a change requested to be made to the databases at one or more of the slave nodes by the master node is logged as allowed, and a change requested to be made to the database at the master node by the one or more slave nodes is logged as disallowed.

22. The method of claim 21 wherein there are a plurality of slave nodes, and step (c) further includes the following rule:
    (ii) if the collision occurs between two or more slave nodes, a change requested to be made to the database at the master node by the first slave node to request a change to the database at the master node is logged as allowed, and a change requested to be made to the database at the master node by the other colliding slave nodes is logged as disallowed.

23. An apparatus for identifying collisions in an active-active database replication system, the system including a plurality of nodes arranged in a master-slave configuration, each node including a database, wherein changes made at each node are replicated to one or more of the other nodes via a master node, and wherein changes can be made at the database of the master node independent of a change request received from a slave node, the apparatus comprising:

(a) means for designating one of the nodes as the master node, the remaining nodes being slave nodes;

(b) means for identifying a collision during data replication between multiple nodes; and (c) means for responding to the collision by using the following rule:

(i) if the collision occurs between the master node and one or more of the slave nodes, as a result of a change made at the database of the master node independent of a change request received from a slave node, a change requested to be made to the databases at one or more of the slave nodes by the master node is logged as allowed, and a change requested to be made to the database at the master node by the one or more slave nodes is logged as disallowed.

24. The apparatus of claim 23 wherein there are a plurality of slave nodes, and the means for responding to the collision further uses the following rule:

(ii) if the collision occurs between two or more slave nodes, a change requested to be made to the database at the master node by the first slave node to request a change to the database at the master node is logged as allowed, and a change requested to be made to the database at the master node by the other colliding slave nodes is logged as disallowed.

25. A method for resolving collisions in an active-active database replication system, the system including a plurality of nodes arranged in a network configuration, each node including a database, wherein changes made at the databases of each node are replicated to the databases at one or more of the other nodes via intervening nodes, and wherein changes can be made at the database of a node independent of a change request received from a lower precedence node, the method comprising:

(a) designating a nodal precedence order for each of the nodes;

(b) detecting a collision during data replication between multiple nodes; and (c) when a collision occurs between two or more nodes, resolving the collision by using the following rule:

a change requested to be made to the databases at a lower precedence node by a higher precedence node, as a result of a change made at the database of the higher precedence node independent of a change request received from a lower precedence node, is allowed, and a change requested to be made to the database at a higher precedence node by a lower precedence node is disallowed.

26. An apparatus for resolving collisions in an active-active database replication system, the system including a plurality of nodes arranged in a network configuration, each node including a database, wherein changes made at the databases of each node are replicated to the databases at one or more of the other nodes via intervening nodes and wherein changes can be made at the database of a node independent of a change reciuest received from a lower precedence node, the apparatus comprising:

(a) means for designating a nodal precedence order for each of the nodes;

(b) means for detecting a collision during data replication between multiple nodes; and (c) means for resolving the collision when a collision occurs between two or more nodes including the following rule:

a change requested to be made to the databases at a lower precedence node by a higher precedence node, as a result of a change made at the database of the higher precedence node independent of a change request received from a lower precedence node, is allowed, and a change requested to be made to the database at a higher precedence node by a lower precedence node is disallowed.

\* \* \* \* \*